(12) United States Patent
Tobita et al.

(10) Patent No.: US 11,565,301 B2
(45) Date of Patent: Jan. 31, 2023

(54) METAL MEMBER MANUFACTURING METHOD

(71) Applicant: TOYOTA JIDOSHA KABUSHIKI KAISHA, Toyota (JP)

(72) Inventors: Shunsuke Tobita, Toyota (JP); Tetsuji Egawa, Okazaki (JP); Masahide Tatsutomi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 17/140,178

(22) Filed: Jan. 4, 2021

(65) Prior Publication Data

US 2021/0276068 A1 Sep. 9, 2021

(30) Foreign Application Priority Data

Mar. 5, 2020 (JP) ................. JP2020-37880

(51) Int. Cl.
*B21D 28/26* (2006.01)

(52) U.S. Cl.
CPC ................. *B21D 28/26* (2013.01)

(58) Field of Classification Search
CPC ........ B21D 22/10; B21D 28/02; B21D 28/24; B21D 28/26; B21D 35/001; B21D 35/002; B21C 35/02; B21C 35/04; B21C 35/026; B23P 13/04; B23P 13/00; B23P 13/02

See application file for complete search history.

(56) References Cited

U.S. PATENT DOCUMENTS

| | | | | |
|---|---|---|---|---|
| 6,145,365 | A * | 11/2000 | Miyahara | B23P 15/00 72/340 |
| 6,662,437 | B2 * | 12/2003 | Kawashima | H05K 13/041 29/832 |
| 2003/0157359 | A1 * | 8/2003 | Uehara | B21K 23/00 257/E23.101 |
| 2018/0369936 | A1 | 12/2018 | Egawa | |

FOREIGN PATENT DOCUMENTS

JP 2019-5823 A 1/2019

* cited by examiner

*Primary Examiner* — Teresa M Ekiert
(74) *Attorney, Agent, or Firm* — Oblon, McClelland, Maier & Neustadt, L.L.P.

(57) ABSTRACT

A metal member manufacturing method according to one form of this disclosure is a method of manufacturing a metal member that is thinner at some portions than at other portions. The method includes a formation step of pressing one surface of surfaces of a metal workpiece that are perpendicular to a thickness direction with a press-working die so as to form a raised portion in the other surface, and a cutting step of moving a cutting blade along the other surface to cut off the raised portion by shaving. In the formation step, the raised portion is formed such that the area of a cross-section of the raised portion that is parallel to a moving direction of the cutting blade and perpendicular to the other surface decreases toward an end of the raised portion on a rear side in the moving direction of the cutting blade.

3 Claims, 3 Drawing Sheets

METAL MEMBER MANUFACTURING METHOD

CROSS-REFERENCE TO RELATED APPLICATION

This application claims priority to Japanese Patent Application No. 2020-037880 filed on Mar. 5, 2020, incorporated herein by reference in its entirety.

BACKGROUND

1. Technical Field

This disclosure relates to a metal member manufacturing method, and relates to, for example, a method of manufacturing a metal member that is thinner at some portions than at other portions.

2. Description of Related Art

In recent years, members used for vehicles and the like are required to be further reduced in weight from the viewpoint of energy conservation, and processing techniques for processing members so as to be thinner at some portions for which the required strength is relatively low than at other portions have been put to practical use.

For example, the metal member manufacturing method of Japanese Patent Application Publication No. 2019-5823 (JP 2019-5823 A) involves pressing one surface of surfaces of a metal workpiece that are perpendicular to a thickness direction with a press-working die so as to form a raised portion in the other surface, and then moving a cutting blade along the other surface to cut off the raised portion by shaving.

SUMMARY

The present applicant found the following issue: In the metal member manufacturing method of JP 2019-5823 A, the height of a part of the raised portion on a side where cutting starts is substantially equal to the height of the other part thereof, so that a cutting edge of the cutting blade is subjected to a large impact load when shaving the raised portion. This shortens the life of the cutting blade.

This disclosure has been made in view of such a problem, and provides a metal member manufacturing method that can shave a raised portion while avoiding shortening the life of a cutting blade.

A metal member manufacturing method according to one aspect of this disclosure is a method of manufacturing a metal member that is thinner at some portions than at other portions, the method including:
  a formation step of pressing one surface of surfaces of a metal workpiece that are perpendicular to a thickness direction with a press-working die so as to form a raised portion in the other surface; and
  a cutting step of moving a cutting blade along the other surface to cut off the raised portion by shaving,
  wherein in the formation step, the raised portion is formed such that the area of a cross-section of the raised portion that is parallel to a moving direction of the cutting blade and perpendicular to the other surface decreases toward an end of the raised portion on a rear side in the moving direction of the cutting blade.

Thus, the impact load on the cutting edge of the cutting blade upon the cutting edge coming into contact with the raised portion can be reduced, which makes it possible to shave the raised portion while avoiding shortening the life of the cutting blade.

In the above metal member manufacturing method, in the formation step, the raised portion may be formed such that the area of the cross-section of the raised portion that is parallel to the moving direction of the cutting blade and perpendicular to the other surface decreases stepwise toward the end of the raised portion on the rear side in the moving direction of the cutting blade.

In the above metal member manufacturing method, in the formation step, the raised portion may be formed such that the area of the cross-section of the raised portion that is parallel to the moving direction of the cutting blade and perpendicular to the other surface decreases along a curve toward the end of the raised portion on the rear side in the moving direction of the cutting blade.

According to this disclosure, a metal member manufacturing method that can shave a raised portion while avoiding shortening the life of a cutting blade can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A specific embodiment to which this disclosure is applied will be described in detail below with reference to the drawings. However, the disclosure is not limited to the following embodiment. To clarify the illustration, the following description and the drawings are simplified as necessary.

Embodiment 1

Figure 1:
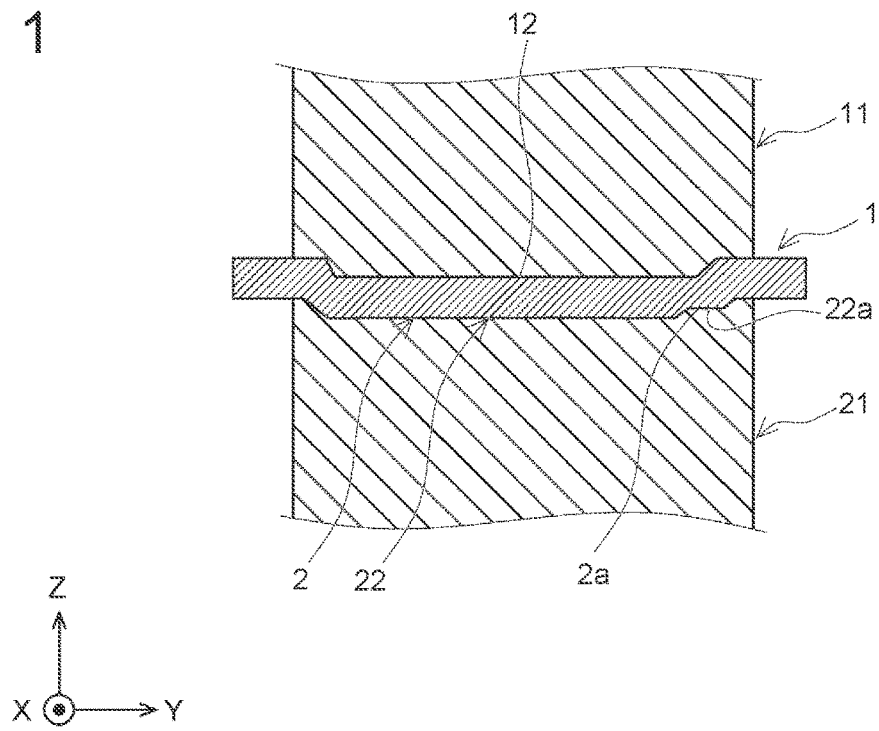
FIG. 1 is a sectional view showing how a raised portion is formed in a metal workpiece.
Figure 2:
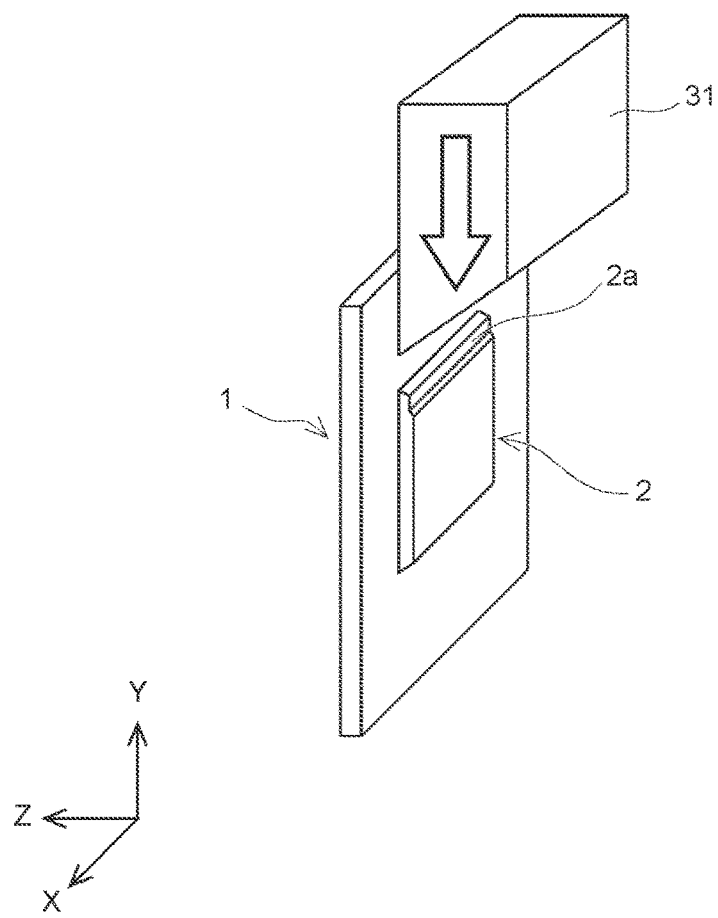
FIG. 2 is a perspective view showing how the raised portion is shaved.
Figure 3:
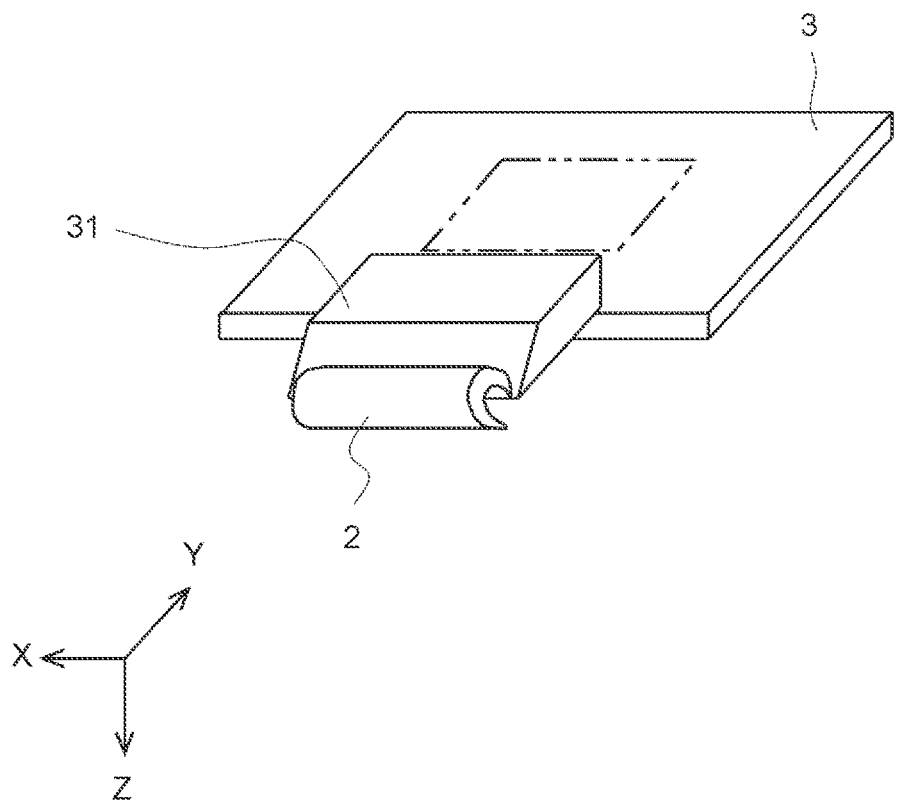
FIG. 3 is a perspective view showing a state upon completion of shaving.

FIG. 1 is a sectional view showing how a raised portion is formed in a metal workpiece. FIG. 2 is a perspective view showing how the raised portion is shaved. FIG. 3 is a perspective view showing a state upon completion of shaving. To clarify the illustration, a three-dimensional (XYZ) coordinate system is used in the following description. Here, a Z-axis direction is a thickness direction of the metal workpiece.

First, as shown in FIG. 1, a raised portion 2 is formed in a plate-shaped metal workpiece 1. Here, the raised portion 2 is formed such that the area of a YZ-cross-section of the raised portion 2 at a part on a Y-axis plus side (i.e., a part on a side where cutting by a cutting blade 31 to be described later starts) decreases toward the Y-axis plus side. Specifically, the metal workpiece 1 has a surface on a Z-axis plus side and a surface on a Z-axis minus side that are substantially parallel to an XY-plane, and the metal workpiece 1 is sandwiched at a desired position between a first press-working die 11 and a second press-working die 21 from the Z-axis direction.

For example, the first press-working die 11 is disposed such that an end surface on the Z-axis minus side is substantially parallel to the XY-plane, and includes a protrusion 12 that protrudes toward the Z-axis minus side. The second press-working die 21 houses a portion of the metal workpiece 1 pressed by the protrusion 12 of the first press-working die 11. For example, the second press-working die 21 includes a recess 22 that is recessed toward the Z-axis minus side and that has a stepped part 22a which is a part on the Y-axis plus side and at which the depth in the Z-axis direction is smaller than at the other part.

The first press-working die 11 and the second press-working die 21 are disposed such that the protrusion 12 of the first press-working die 11 and the recess 22 of the second press-working die 21 face each other in the Z-axis direction, and at least one of the first press-working die 11 and the second press-working die 21 can move in the Z-axis direction.

When the metal workpiece 1 is sandwiched at a desired position between the protrusion 12 of the first press-working die 11 and the recess 22 of the second press-working die 21, the raised portion 2 is formed in the metal workpiece 1. Here, as a result of sandwiching the metal workpiece 1 between the first press-working die 11 and the second press-working die 21 of the above-described shapes, a stepped part 2a at which the height in the Z-axis direction is smaller than at the other part is formed, for example, at a part of the raised portion 2 on the Y-axis plus side, in an entire region in an X-axis direction. In other words, the stepped part 2a forms, at a part of the raised portion 2 on the Y-axis plus side, a part at which the amount of protrusion from the surface of the metal workpiece 1 on the Z-axis minus side toward the Z-axis minus side is smaller than at the other part.

Next, a lubricant is applied to a cutting edge of the cutting blade 31, and as shown in FIG. 2, the cutting blade 31 is moved toward the Y-axis minus side along the surface of the metal workpiece 1 on the Z-axis minus side to cut off the raised portion 2 by shaving. Here, the cutting blade 31 can move in a Y-axis direction. The cutting edge of the cutting blade 31 is substantially parallel to the XY-plane and extends in the X-axis direction.

Since a part of the raised portion 2 on the Y-axis plus side has the stepped part 2a at which the amount of protrusion toward the Z-axis minus side is smaller than at the other part, the cutting edge of the cutting blade 31 is subjected to a smaller impact load upon the cutting edge of the cutting blade 31 coming into contact with the raised portion 2 than when the raised portion 2 does not have the stepped part 2a. It is therefore possible to shave the raised portion 2 while avoiding shortening the life of the cutting blade 31.

Thereafter, as shown in FIG. 3, when the cutting edge of the cutting blade 31 reaches an end of the raised portion 2 on the Y-axis minus side, a metal member 3 with the raised portion 2 cut off can be manufactured. As has been described above, in the manufacturing method of the metal member 3 of this embodiment, the raised portion 2 is formed such that the area of the YZ-cross-section of the raised portion 2 decreases toward the end of the raised portion 2 on the Y-axis plus side. Thus, the impact load on the cutting edge of the cutting blade 31 can be reduced, which makes it possible to shave the raised portion 2 while avoiding shortening the life of the cutting blade 31.

Moreover, in the manufacturing method of the metal member 3 of this embodiment, the raised portion 2 having the stepped part 2a can be easily formed by sandwiching the metal workpiece 1 between the first press-working die 11 and the second press-working die 21.

Figure 4:
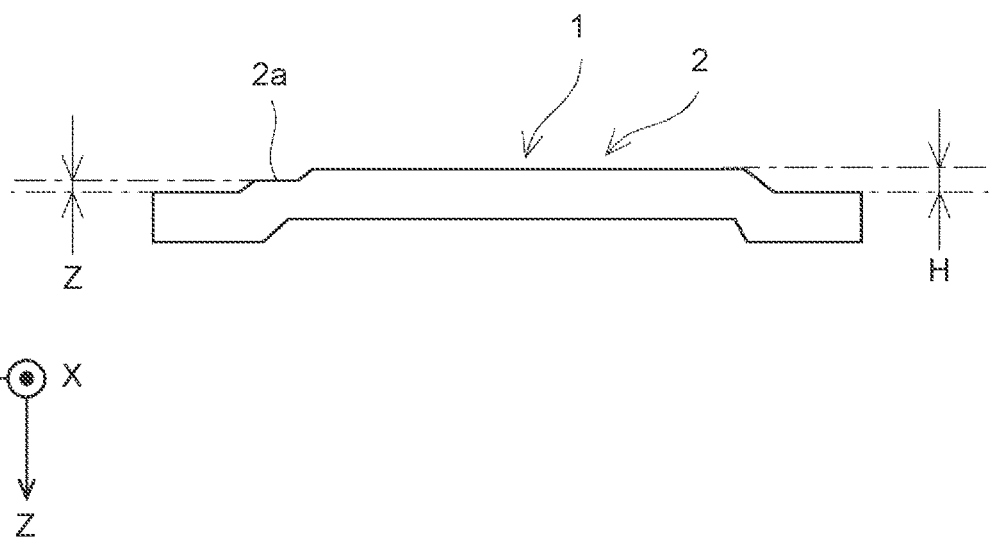
FIG. 4 is a view illustrating a preferable height of a stepped part in a Z-axis direction.

Next, a preferable shape of the stepped part 2a of the raised portion 2 of this embodiment will be described. FIG. 4 is a view illustrating a preferable height in the Z-axis direction of the stepped part of the embodiment. It is preferable that the height of the stepped part 2a of the raised portion 2 in the Z-axis direction meet the following Formula 1. Here, as shown in FIG. 4, Z is the height of the raised portion 2 at the stepped part 2a from the surface of the metal workpiece 1 on the Z-axis minus side, and H is the height of the raised portion 2 at a position at which the raised portion 2 protrudes farthest from the surface of the metal workpiece 1 on the Z-axis minus side.

$$H/10 < Z < H \qquad \text{Formula 1:}$$

For example, if H is assumed to be 5 mm, the stepped part 2a is difficult to form when Z is equal to or smaller than H/10.

Other Embodiments

Figure 5:
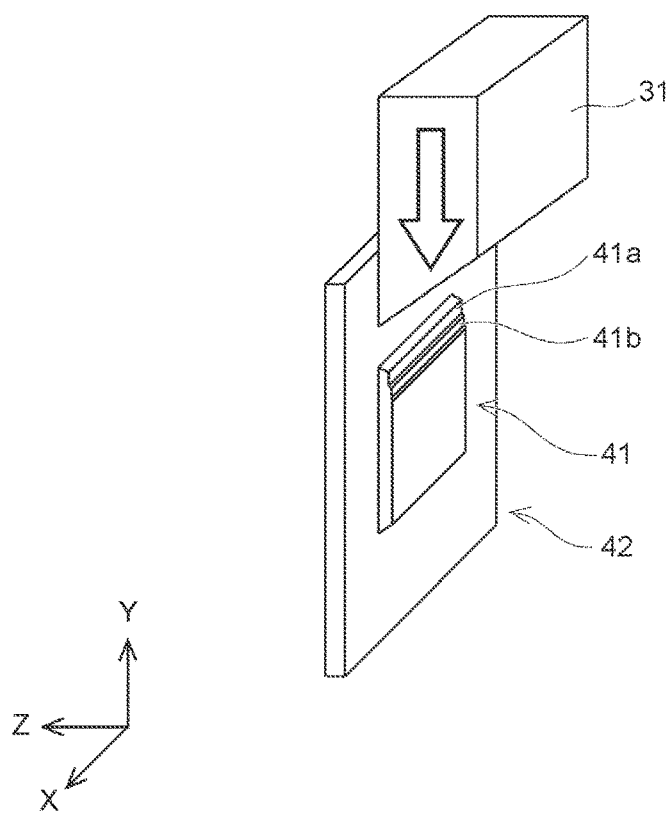
FIG. 5 is a perspective view showing how a raised portion of another shape is shaved.

In the metal workpiece 1 of Embodiment 1, the raised portion 2 having the stepped part 2a as one step is formed. Alternatively, as shown in FIG. 5, a raised portion 41 having stepped parts 41a, 41b as two steps may be formed in a metal workpiece 42. Thus, the raised portion 41 may be formed such that the area of a YZ-cross-section of the raised portion 41 decreases stepwise toward an end of the raised portion 41 on the Y-axis plus side. The number of the steps of the stepped part etc. can be changed as necessary according to the rake angle of the cutting blade 31, the material of the metal workpiece, the moving speed of the cutting blade 31, etc.

Figure 6:
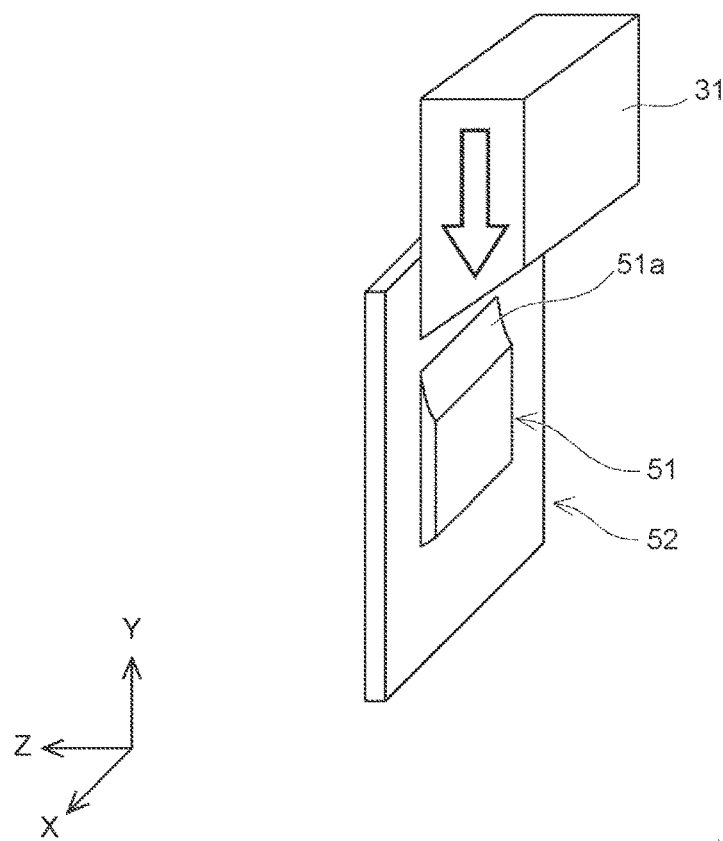
FIG. 6 is a perspective view showing how a raised portion of yet another shape is shaved.

Further, as shown in FIG. 6, a raised portion 51 having a curved part 51a, instead of a stepped part, at a part of the raised portion 51 on the Y-axis plus side may be formed in a metal workpiece 52. Thus, the raised portion 51 may be formed such that the area of a YZ-cross-section of the raised portion 51 decreases along a curve toward an end of the raised portion 51 on the Y-axis plus side. The curvature of the curved part 51a etc. can be changed as necessary according to the rake angle of the cutting blade 31, the material of the metal workpiece, the moving speed of the cutting blade 31, etc.

In short, the raised portion should be formed such that the amount of protrusion of the raised portion from the surface on the Z-axis minus side becomes smaller at a part of the raised portion on the Y-axis plus side than at the other part.

This disclosure is not limited to the above embodiments but can be changed as necessary within the scope of the gist thereof. For example, in the above embodiments, a stepped part or a curved part is formed at a part of the raised portion on the Y-axis plus side. However, a stepped part or a curved part may be formed along a peripheral edge of the raised portion.

What is claimed is:
1. A method of manufacturing a metal member that is thinner at some portions than at other portions, the method comprising:
   a formation step of pressing one surface of surfaces of a metal workpiece that are perpendicular to a thickness direction with a press-working die so as to form a raised portion having a first raised portion and a second raised portion in the other surface; and a cutting step of moving a cutting blade along the other surface to cut off the raised portion by shaving, wherein the first raised portion is thicker than the second raised portion and the second raised portion is arranged before the first raised portion in the moving direction of the cutting blade so that the cutting blade initially comes into contact with the second raised portion during the cutting step.

2. The metal member manufacturing method according to claim 1, wherein in the formation step, the second raised portion is formed to decrease in thickness stepwise from the first raised portion.

3. The metal member manufacturing method according to claim 1, wherein in the formation step, the second raised portion is formed to decrease in thickness along a curve from the first raised portion.

\* \* \* \* \*